3,294,775
REACTION PRODUCTS OF STABILIZED ROSIN AMINE AND ORGANIC ACID PHOSPHATE ESTERS
Kurt J. Wasserman, Wanaque, N.J., assignor to Wasco Laboratories, Inc., Vernon, N.J., a corporation of New Jersey
No Drawing. Filed Feb. 11, 1964, Ser. No. 343,957
1 Claim. (Cl. 260—100)

The present invention relates to resinous reaction products and, more particularly, to such reaction products which have many useful applications.

In accordance with the present invention, it has been discovered that such products can be produced by reacting stabilized rosin amines with organic acid phosphate esters.

The organic acid phosphate esters used in connection with practicing this invention may have two basic structures, namely, monoester and diester, as shown below:

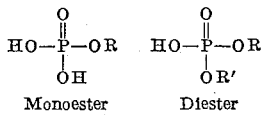

Monoester   Diester

The R and R' groups may be straight chain or branched alkyl groups having from 1 to 24 carbon atoms, polyoxyethylene having from 2 to 32 ethylene oxide units, alkyl phenoxy polyoxyethylene containing 2 to 32 ethylene oxide units and 1 to 24 carbon atoms in the phenolic alkyl chain, and polyhydroxy compounds, such as ethylene glycol, glycerol, or sorbitol. In actual application mixture of monoesters and diesters may be applied. The R and R' groups of a diester may be similar or dissimilar. Such organic acid phosphate esters are described in U.S. Patents No. 2,005,619, No. 2,052,029, No. 2,121,611 and No. 3,004,056.

Also included among the acid phosphate esters are those monoesters which have been partially neutralized with an alkali metal or an amine. The structural formula for such a monoester is:

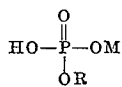

where M may be an alkali metal, such as potassium and sodium, or an amine.

The stabilized rosin amine used in connection with practicing this invention may be of primary amines derived from various rosins and rosin acids by conversion of the carboxylic acid groups to primary amino groups. These rosin amines include, derivatives of gum and wood rosin containing chiefly abietyl amine, derivatives of dehydrogenated rosin containing chiefly dihydroabietyl and tetrahydroabietyl amine, derivatives of heat treated rosin, derivatives of polymerized rosin, derivatives of summarized rosin containing substantial amounts of abietyl amine, and derivatives of pure rosin acids, namely, abietyl amine, dehydroabietyl amine and tetrahydroabietyl amine. The preparation of such rosin amines is described in U.S. Patents No. 2,510,295 and No. 2,776,955.

Acid salts of stabilized rosin amine, such as described above, may be employed in place of the stabilized rosin amine. In this case, the neutralizing acid is weaker than the acid phosphate reactant and is, therefore, liberated during reaction. For example, if the acetic acid salt of stabilized rosin amine is reacted with an acid phosphate ester, acetic acid is liberated and the phosphate ester salt is formed.

The reaction between acid phosphate esters and stabilized rosin amine can be carried out readily in an inert solvent, such as benzene or mineral spirits, or by the fusion method wherein the undiluted reactants are blended.

The following examples illustrate the manner of practicing the present invention.

*Example I*

Ten (10) grams of dehydroabietyl amine dissolved in 100 grams of toluene were added to a reaction flask fitted with an agitator, a condenser and dropping funnel. Twelve (12) grams of di-2-ethylhexyl acid phosphate were added dropwise, using good agitation, to this mixture. The reaction mixture was heated for 30 minutes at 85° C. The reaction product, when isolated by vaporization of toluene, was a resinous material with a softening point of 32° C.

*Example II*

A beaker fitted with an agitator was charged with 48 grams of technical grade dehydroabietyl amine which was heated to 35° C. to reduce its viscosity. Using good agitation, 52 grams of technical grade octyl acid phosphate, consisting of mixture of monoesters and diesters, were added quickly. Immediate reaction occurred which was indicated by a strong exotherm. The product was a resinous material with a softening point of about 30° C.

*Example III*

Using the apparatus of Example I, 100 grams of a 10% solution of technical grade dehydroabietyl amine in ethyl acetate were reacted with 100 grams of a 10% solution of polyoxyethylene nonyl phenol condensate diester acid phosphate in ethyl acetate. The reaction mixture was heated to 77° C. and held at that temperature for 30 minutes. Upon cooling, the reaction mixture formed a strong gel.

*Example IV*

Using the apparatus of Example II, 52 grams of technical grade dehydroabietyl amine were reacted with 48 grams of phenyl acid phosphate consisting of a mixture of monoesters and diesters. The reaction product was a resinous material having a softening point of 135° C.

*Example V*

Using the apparatus of Example I, 100 grams of a 10% solution of a polyoxyethylene nonyl phenol condensate acid phosphate monoester in toluene were partially neutralized with 1 gram of ammonia having a concentration of 26° Bé. and then reacted with 75 grams of a 10% solution of dehydroabietyl amine in toluene. The reaction mixture was heated at 75° C., for 30 minutes. Upon cooling to 30° C., the reaction mixture formed a thixotropic gel. The isolated reaction product was a soft resinous material at room temperature.

*Example VI*

Using the apparatus of Example II, 100 grams of technical grade dehydroabietyl amine were reacted with 50 grams of technical grade octyl phenyl acid phosphate ester. The reaction mixture quickly formed a strong gel which, upon heating to 150° C., produced a fluid reaction mixture. The reaction mixture was further heated to 210° C., and then cooled. The reaction product was a hard, transparent resin with a softening point of 125° C.

Reaction products may be obtained by using proper mole quantities for complete reaction, by using excess amounts of rosin amine, or by using excess amounts of organic acid phosphates. By varying the reactant ratios a number of end products having specific melting points and compatibilities may be obtained. Also mixtures of various organic acid phosphates may be used as often is the case in actual applications, since commercially available acid phosphates are usually combinations of monoesters and diesters. Temperatures and pressures applied while carrying out the reactions are not critical and may be varied from 0° C. to 150° C. and from 1 atmosphere to 200 atmospheres, respectively.

The reaction products of this invention are of particular interest because of their many useful applications, as rust inhibitors, antistatics agents, bacteriacidal and fungicidal agents, gelling agents for solvents and oils, anti-corrosion additives, and coatings of the aqueous and solvent base types.

Tests have shown that ordinary solvents and mineral oils can be converted to thixotropic gels by the addition of 5 to 10% of the reaction products of stabilized rosin amine and polyethylene oxide nonyl phenol acid phosphates. The viscosity of dichloroethylene and other chlorinated solvents can be raised by this method so that useful paint removing agents may be formulated. The addition of certain reaction products to mineral oils have produced high viscosity lubricating greases, which show kood anti-corrosion properties. The tendency to form thixotropic gels may also be used in the formulation of solvent based polishes and the solidification of various fuels.

A coating of the reaction product of dehydroabietyl amine and di-2-ethylhexyl acid phosphate applied to cold rolled steel was proven to be an excellent rust inhibitor when coated samples were tested by submersion in salt water. The reaction products disclosed herein may be added directly to coating formulations to act as a rust inhibitor.

In the application as antistatic agents, the reaction products may be tailor-made to fit specific requirements. For example, the addition of 5% of the reaction product of stabilized rosin amine and stearyl acid phosphate to polyethylene will reduce the formation of static electricity on articles manufactured with the so treated polyethylene.

As bacteriacidal and fungicidal agents, the reaction products of stabilized rosin amine with the lower alkyl (4 to 9 carbon atoms) acid phosphate have given high inhibition of growth of *Pseudomonas aeruginosa* and *Aspergillus niger*. This activity in combination with the resinous nature of the products disclosed in this invention makes them desirable additives to coatings and adhesives.

It will be understood that the details and examples hereinbefore set forth are illustrative only, and that the invention, as broadly described and claimed, is in no way limited thereby.

What is claimed is:

Resinous products formed by the reaction at a temperature from about 0° C. to 150° C., and a pressure of from about 1 to 200 atmospheres of:
(1) dehydroabietyl amine; and
(2) a reactive product selected from the group consisting of
   (A) polyoxyethylene acid phosphate diesters having from 1 to 32 ethylene oxide units in each polyoxyethylene chain,
   (B) acid phosphate diesters with ester moieties consisting of alkyl phenoxy polyoxyethylene condensates,
   (C) polyoxyethylene acid phosphate monoesters having from 1 to 32 ethylene oxide units in the polyethylene oxide chain, and
   (D) acid phosphate monoesters with an ester moiety consisting of alkyl phenoxy, polyoxyethylene condensates having from 1 to 24 carbon atoms in the alkyl chain and having from 2 to 32 ethylene oxide units in the polyoxyethylene chain.

References Cited by the Examiner
UNITED STATES PATENTS 3,053,769   9/1962   Zajac     260—925

LEON J. BERCOVITZ, *Primary Examiner.*

F. McKELVEY, *Assistant Examiner.*